US012689452B2

(12) United States Patent
Gomelsky et al.

(10) Patent No.: US 12,689,452 B2
(45) Date of Patent: Jul. 21, 2026

(54) DYNAMIC ANTENNA TUNING COMPENSATION IN PORTABLE RADIO COMMUNICATION DEVICES

(71) Applicant: MOTOROLA SOLUTIONS, INC., Chicago, IL (US)

(72) Inventors: Alexander Gomelsky, Holon (IL); Tomer Dobershtein, Ashdod (IL); Lionid Kodner, Modi'in-Maccabim-Re'ut (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 246 days.

(21) Appl. No.: 18/598,488

(22) Filed: Mar. 7, 2024

(65) Prior Publication Data

US 2025/0286633 A1 Sep. 11, 2025

(51) Int. Cl.
H04B 17/12 (2015.01)
H04B 17/21 (2015.01)
H04B 17/391 (2015.01)

(52) U.S. Cl.
CPC ........... H04B 17/12 (2015.01); H04B 17/221 (2023.05); H04B 17/3912 (2015.01)

(58) Field of Classification Search
CPC .. H04B 17/12; H04B 17/221; H04B 17/3912; H04B 1/38; H04B 1/0458
See application file for complete search history.

(56) References Cited

U.S. PATENT DOCUMENTS

| | | | |
|---|---|---|---|
| 8,023,902 B2 | 9/2011 | Mouloudi et al. | |
| 8,204,446 B2 | 6/2012 | Scheer et al. | |
| 8,615,209 B1 | 12/2013 | Khlat | |
| 8,787,215 B1 * | 7/2014 | Khlat ................... | H04B 17/102 370/294 |
| 9,774,362 B1 | 9/2017 | Sammeta et al. | |
| 10,277,267 B1 | 4/2019 | Kerselaers | |
| 10,420,023 B2 | 9/2019 | Ramasamy et al. | |
| 2014/0357200 A1 | 12/2014 | Rousu et al. | |
| 2015/0054699 A1 | 2/2015 | Ali et al. | |
| 2019/0215765 A1 * | 7/2019 | Ramasamy ....... | H04W 52/0206 |

FOREIGN PATENT DOCUMENTS

| | | |
|---|---|---|
| CN | 108110423 B | 3/2020 |
| JP | 3717741 B2 | 11/2005 |
| JP | 6479013 B2 | 3/2019 |

OTHER PUBLICATIONS

International Search Report and Written Opinion for Application No. PCT/US2025/015805 dated Jun. 12, 2025 (10 pages).

* cited by examiner

*Primary Examiner* — Renan Luque

(74) *Attorney, Agent, or Firm* — Michael Best & Friedrich LLP

(57) ABSTRACT

Devices, systems, and methods for dynamic antenna tuning compensation. One example method includes controlling a transmitter to transmit a first plurality of signals, each of the first plurality of signals having a fundamental frequency different from the others. The method includes controlling a receiver to receive a second plurality of signals, wherein each of the second plurality of signals is received at a harmonic frequency of one of the first plurality of signals. The method includes determining at least one tuning parameter for an antenna tuner based on the second plurality of signals. The method includes controlling the antenna tuner to operate using the at least one tuning parameter.

20 Claims, 8 Drawing Sheets

Fundamental TX 350-470 MHz ~216

502

$f_1$    $f_2$    $f_3$

228

Second Harmonics 700-940 MHz

504

LTE RX RSSI: B20(791-821)/B28 (758-803MHz) Etc.

506 max    RSSI

Transmission Between LMR And LTE Antennas $2f_1$    $2f_2$    $2f_3$

Init State

508    RSSI max

Tuner Direction Change

510    RSSI max

Tuner Direction Change

600

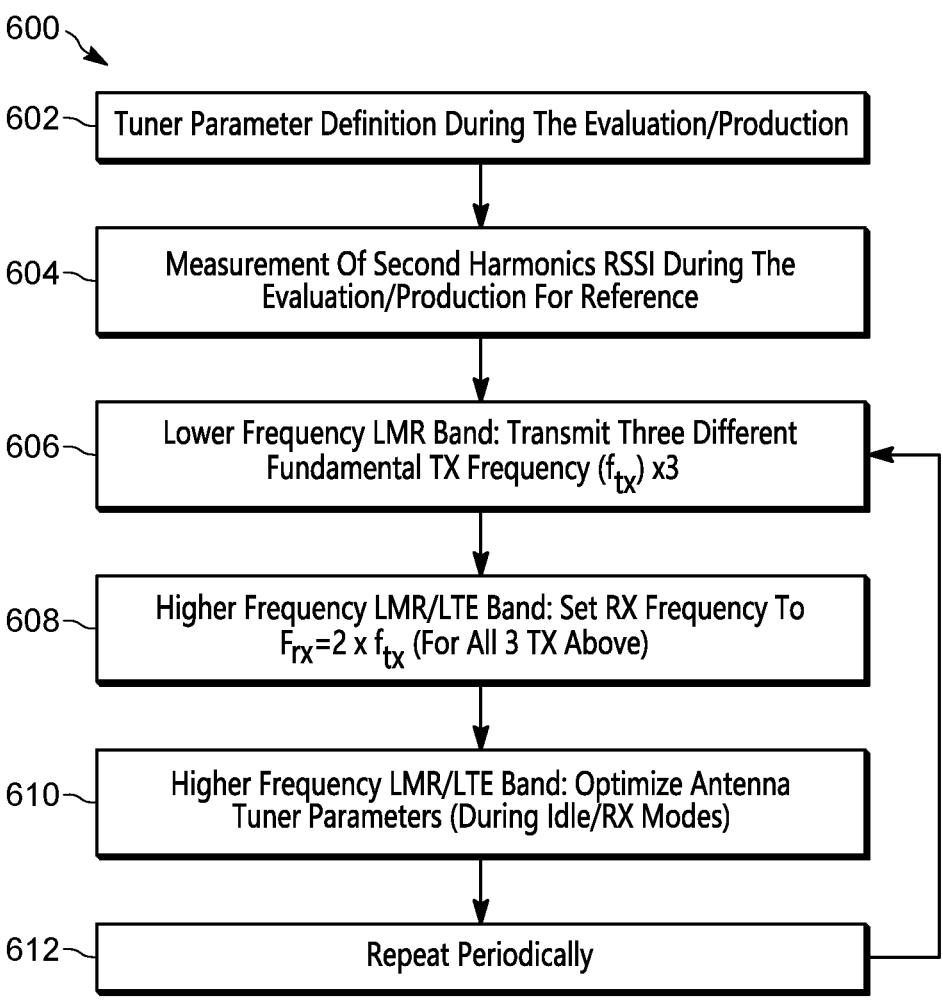

602 — Tuner Parameter Definition During The Evaluation/Production

604 — Measurement Of Second Harmonics RSSI During The Evaluation/Production For Reference 606 — Lower Frequency LMR Band: Transmit Three Different Fundamental TX Frequency ($f_{tx}$) x3

608 — Higher Frequency LMR/LTE Band: Set RX Frequency To $F_{rx}=2 \times f_{tx}$ (For All 3 TX Above)

610 — Higher Frequency LMR/LTE Band: Optimize Antenna Tuner Parameters (During Idle/RX Modes)

612 — Repeat Periodically

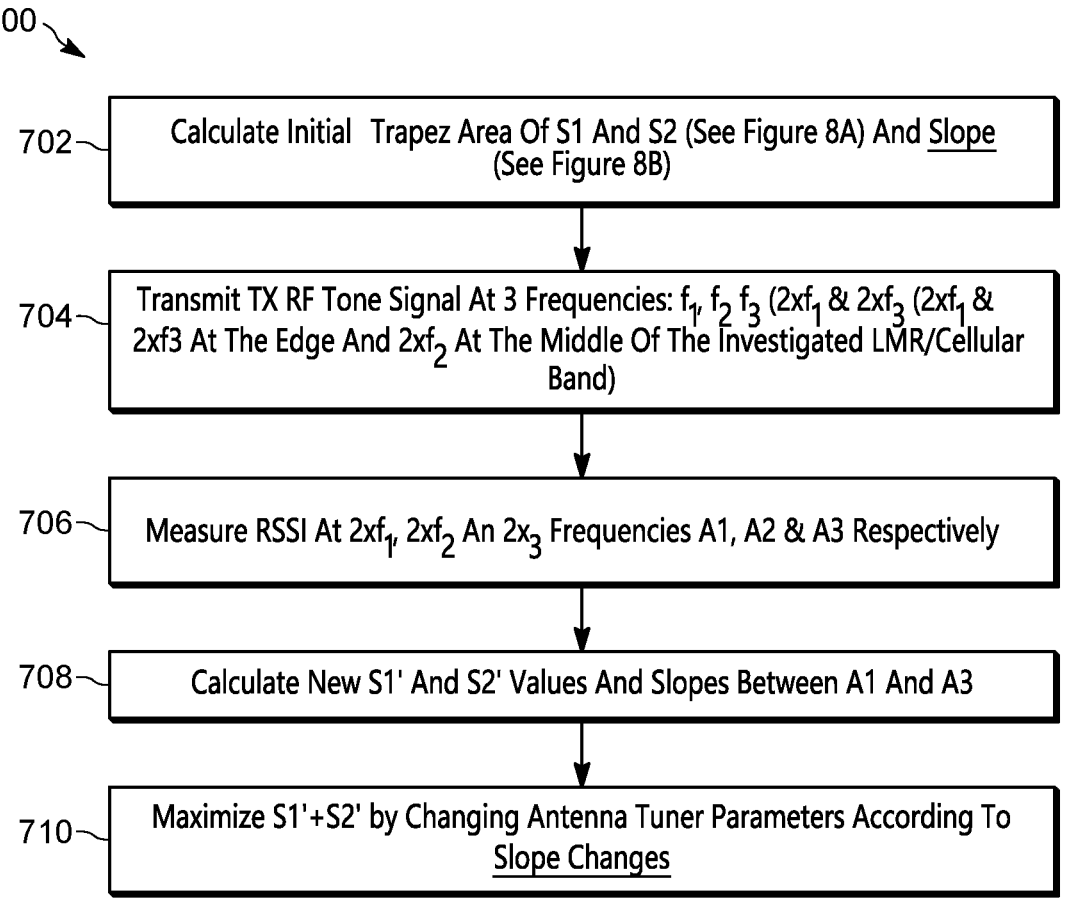

702 — Calculate Initial  Trapez Area Of S1 And S2 (See Figure 8A) And <u>Slope</u> (See Figure 8B)

704 — Transmit TX RF Tone Signal At 3 Frequencies: $f_1$, $f_2$ $f_3$ ($2xf_1$ & $2xf_3$ ($2xf_1$ & $2xf3$ At The Edge And $2xf_2$ At The Middle Of The Investigated LMR/Cellular Band)

706 — Measure RSSI At $2xf_1$, $2xf_2$ An $2x_3$ Frequencies A1, A2 & A3 Respectively 708 — Calculate New S1' And S2' Values And Slopes Between A1 And A3

710 — Maximize S1'+S2' by Changing Antenna Tuner Parameters According To <u>Slope Changes</u>

FIG. 7

Illustration Of Area Calculation (S1&S2) In Optimization Process

Illustration Of Slope Calculation In Optimization Process

DYNAMIC ANTENNA TUNING COMPENSATION IN PORTABLE RADIO COMMUNICATION DEVICES

BACKGROUND

Public safety and other organizations use communication networks and portable electronic devices to facilitate communication among their members. Some of these devices operate using multiple frequency bands, including in the LMR and LTE bands.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 6 is a flowchart illustrating a method for dynamic antenna tuning compensation in a wireless communication device, according to some examples.

FIG. 7 is a flowchart illustrating a method for determining antenna tuning parameters in a wireless communication device, according to some examples.

Figure 1:
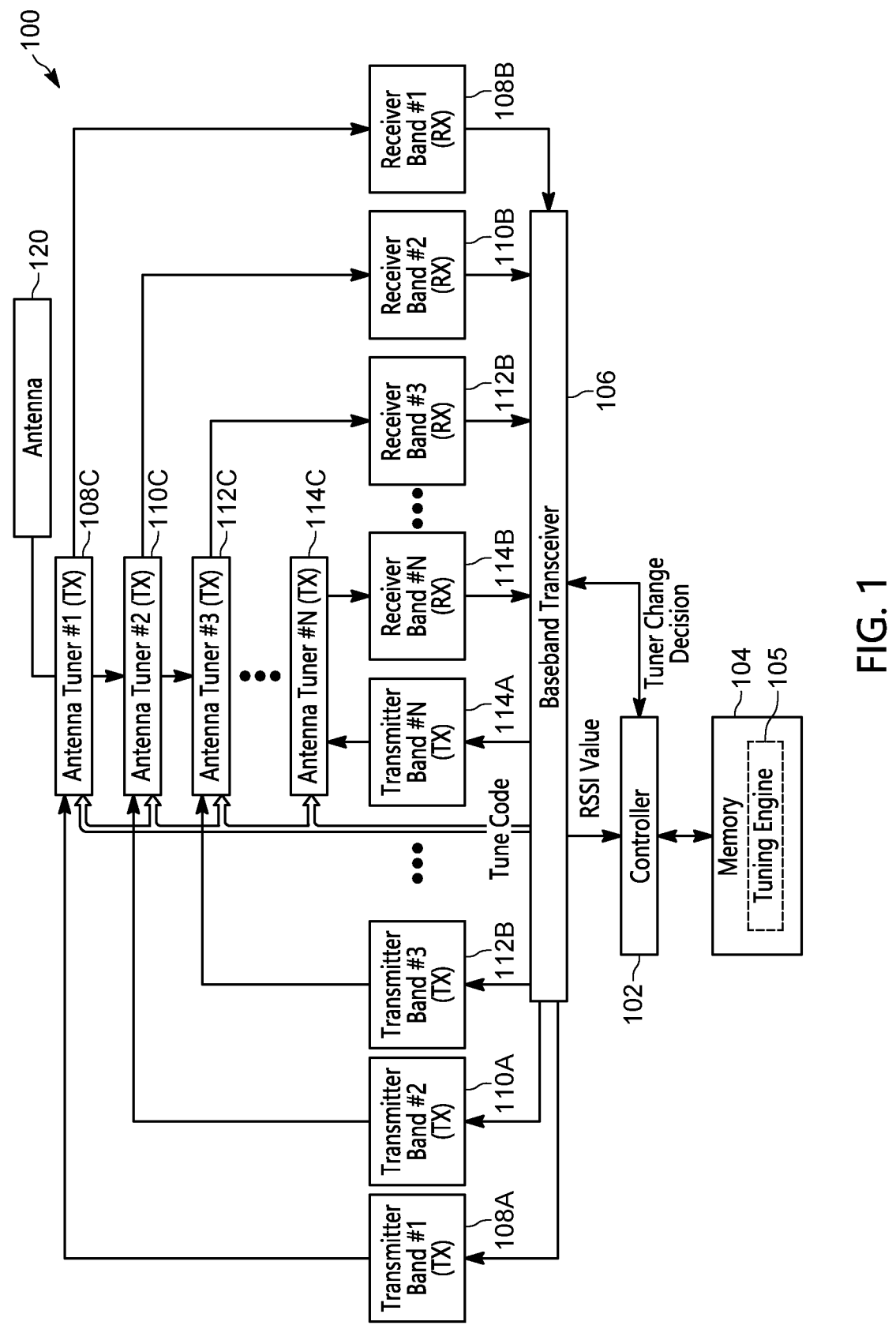
FIG. 1 schematically illustrates a multi-band wireless communication device, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Wireless communication devices include antenna tuners, which are configured with predefined values, which are determined during design and/or manufacturing of the devices and flashed during mass production. Over the lifespan of such devices, the antenna tuning values remain unchanged. However, predefined tuning values cannot take into account changes in antenna environmental conditions, such as body loss, hand loss, head loss, and the proximity of materials such as metal and concrete, and the aging of antenna material, PCB (printed circuit board) material, and passive components. All of these may cause the antenna to detune, resulting in degraded wireless device RF (radiofrequency) performance (e.g., loss of receive sensitivity & transmit power).

Thus, there exists a need for an improved technical method, device, and system for dynamic antenna tuning compensation for wireless communication devices.

Using the examples and aspects presented herein, wireless communication devices can use second harmonics produced in one band to tune and antenna in another band. A wireless communication device transmits signals at know frequencies in one frequency band, while receiving second harmonic signals in another frequency band. The received signals are analyzed to determine whether and how to adjust the antenna tuner for the receiving band.

Using such examples, wireless communication devices can compensate for antenna detuning as conditions change. For example, dynamic compensation may be repeated periodically, retuning the antenna as the wireless communications device is body worn, operated in the hand, placed in a vehicle, or otherwise experiences changes in conditions. Using the examples and aspects provided herein, receiver sensitivity and transmitter power may be maximized despite changing conditions that would otherwise detune the antenna.

In some aspects, the techniques described herein relate to a wireless communication device including a transmitter, a receiver, an antenna coupled to the receiver, an antenna tuner coupled to the antenna, a memory, and an electronic processor coupled to the transmitter, the receiver, the antenna tuner, and the memory. The electronic processor is configured to retrieve, from the memory, executable instructions that, when executed by the electronic processor, cause the electronic processor to: control the transmitter to transmit a first plurality of signals, each of the first plurality of signals having a fundamental frequency different from the others; control the receiver to receive a second plurality of signals, wherein each of the second plurality of signals is received at a harmonic frequency of one of the first plurality of signals; determine at least one tuning parameter for the antenna tuner based on the second plurality of signals; and control the antenna tuner to operate using the at least one tuning parameter.

In some aspects, the techniques described herein relate to a method for operating a wireless communication device. The method includes controlling a transmitter to transmit a first plurality of signals, each of the first plurality of signals having a fundamental frequency different from the others. The method includes controlling a receiver to receive a second plurality of signals, wherein each of the second plurality of signals is received at a harmonic frequency of one of the first plurality of signals. The method includes determining at least one tuning parameter for an antenna tuner based on the second plurality of signals. The method includes controlling the antenna tuner to operate using the at least one tuning parameter.

In some aspects, the techniques described herein relate to a system including: a transmitter, a receiver, an antenna coupled to the receiver, an antenna tuner coupled to the antenna, a memory, and an electronic processor coupled to the transmitter, the receiver, the antenna tuner, and the memory. The electronic processor is configured to retrieve, from the memory, executable instructions that, when executed by the electronic processor, cause the electronic processor to: control the transmitter to transmit a first plurality of signals, each of the first plurality of signals having a fundamental frequency different from the others; control the receiver to receive a second plurality of signals, wherein each of the second plurality of signals is received at a harmonic frequency of one of the first plurality of signals; determine at least one tuning parameter for the antenna tuner based on the second plurality of signals; and control the antenna tuner to operate using the at least one tuning parameter.

Each of the above-mentioned embodiments will be discussed in more detail below, starting with example system and device architectures of the system in which the embodiments may be practiced, followed by an illustration of processing blocks for achieving an improved technical method, device, and system for reliable lockdown communication in wireless electronic locks.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, an example multi-band wireless communication device 100 is provided. In the embodiment illustrated, the multi-band wireless communication device 100 includes a controller 102, a memory 104, a baseband transceiver 106, a plurality of associated transmitters (108A-114A), receivers (108B-114B), and antenna tuners (108C-114C), and an antenna 120. The illustrated components, along with other various modules and components are coupled to each other by or through one or more control or data buses that enable communication therebetween. In some embodiments, the multi-band wireless communication device 100 includes fewer or additional components in configurations different from that illustrated in FIG. 1 and described herein.

As illustrated in FIG. 1, in some examples, each of the plurality of associated transmitters (108A-114A), receivers (108B-114B), and antenna tuners (108C-114C) is configured to operate in a different frequency band. For example, transmitter 108A, receiver 108B, and antenna tuner 108C may be configured to operate in a VHF frequency band, while transmitter 110A, receiver 110B, and antenna tuner 110C are configured to operate in a UHF frequency band. In some examples, the multi-band wireless communication device 100 is configured to operate using the same or similar modulation scheme across the multiple frequency bands. In the illustrated example, the multi-band wireless communication device 100 is configured to operate using one or more land mobile radio (LMR) protocols. LMR systems are terrestrially based, wireless communications systems commonly used by federal, state, local, tribal, and territorial emergency responders, public works companies, and even the military to support voice and data communications. Such systems typically consist of handheld portable two-way radios, mobile two-way radios, base stations, a network, and repeaters. LMR systems provide two-way radio communications, typically in the VHF, UHF, 700 MHz, and 800 MHz frequency bands, for example, implemented in accordance with the Association of Public Safety Communications Officials (APCO) "Project 25" (P25) two-way radio communications protocol. In some embodiments, the multi-band wireless communication device 100 may operate according to the TETRA standard defined by the European Telecommunication Standards Institute (ETSI), the Digital Private Mobile Radio (dPMR) standard also defined by the ETSI, the Digital Mobile Radio (DMR) standard also defined by the ETSI, among other possibilities, and over which multimedia broadcast multicast services (MBMS), single site point-to-multipoint (SC-PTM) services, or Mission Critical Push-to-talk (MCPTT) services may be provided.

The controller 102 is an electronic controller, that includes at least one electronic processor, and is configured to obtain and provide information (for example, from the memory 104 and/or the baseband transceiver 106), and processes the information by executing one or more software instructions or modules, capable of being stored, for example, in a random access memory ("RAM") area or a read only memory ("ROM") of the memory 104 or another non-transitory computer readable medium (not shown). The software can include firmware, one or more applications, program data, filters, rules, one or more program modules, and other executable instructions. The controller 102 is configured to retrieve from the memory 104 and execute, among other things, software related to the control processes and methods described herein. The memory 104 can include one or more non-transitory computer-readable media and includes a program storage area and a data storage area. The program storage area and the data storage area can include combinations of different types of memory, as described herein. In the embodiment illustrated, the memory 104 stores, among other things, a tuning engine 105 (as described herein).

The controller 102 is configured to control the baseband transceiver 106 and the plurality of associated transmitters (108A-114A), receivers (108B-114B), and antenna tuners (108C-114C) to transmit and receive radiofrequency signals (for example, encoded with audio or other data) to and from the multi-band wireless communication device 100. The baseband transceiver 106 encodes and decodes digital data (including digitized audio signals) sent and received by the transmitters (108A-114A) and receivers (108B-114B) via the antenna tuners (108C-114C) and the antenna 120. In some examples, the multi-band wireless communication device 100 is capable of transmitting on one or more frequency bands while simultaneously receiving on one or more other frequency bands.

In some examples, the antenna 120 is a multiband antenna. Alternatively, multiple antennas may be used, each tuned to a particular frequency band and coupled to the associated antenna tuner. In some examples, the antenna 120 is interchangeable, such that the multi-band wireless communication device 100 may be fitted with different multi-band antennas suitable to various use cases.

Whether one or more antennas are used, each transmitter/receiver pair is coupled to an antenna by an antenna tuner (108C-114C). An antenna tuner is an electronic device for matching impedance between a transmitter/receiver and an antenna feed. The antenna tuner operates to optimize the power transfer to the antenna from the transmitter and reduce the reflection of signals from the antenna to the transmitter and from the receiver to the antenna. This results in increased radio signal transmission and reception and reduced signal distortion. The antenna tuners (108C-114C) are coupled to and controllable by the controller 102. As described herein, in some examples, the controller 102 executes a tuning engine 105 to control the antenna tuners (108C-114C).

The controller 102, the baseband transceiver 106, the transmitters (108A-114A), the receivers (108B-114B), and the antenna tuners (108C-114C) may include various digital and analog components (for example, digital signal processors, high band filters, low band filters, and the like), which for brevity are not described herein and which may be implemented in hardware, software, or a combination of both. In some examples, one or more of the transmitter/receiver pairs (108A-114A, 108B-114B) are combined transmitter-receiver components (e.g., transceivers). In other examples, one or more of the transmitter/receiver pairs (108A-114A, 108B-114B) include separate transmitter and receiver components.

In some aspects, the multi-band wireless communication device 100 may include other components, such as a microphone, speaker, display, a push-to-talk (PTT) mechanism (e.g., a mechanical button, key, switch, knob, or a virtual button), which are implemented in hardware, software, or a combination of both. In some examples, the multi-band wireless communication device 100 may be coupled (e.g., using a wired or wireless connection) to an accessory device (e.g., a remote speaker microphone (RSM) or headset). Some examples of the multi-band wireless communication device 100 may also include a display or other input/output devices that enable a user to interact with and control the multi-band wireless communication device 100.

Figure 2:
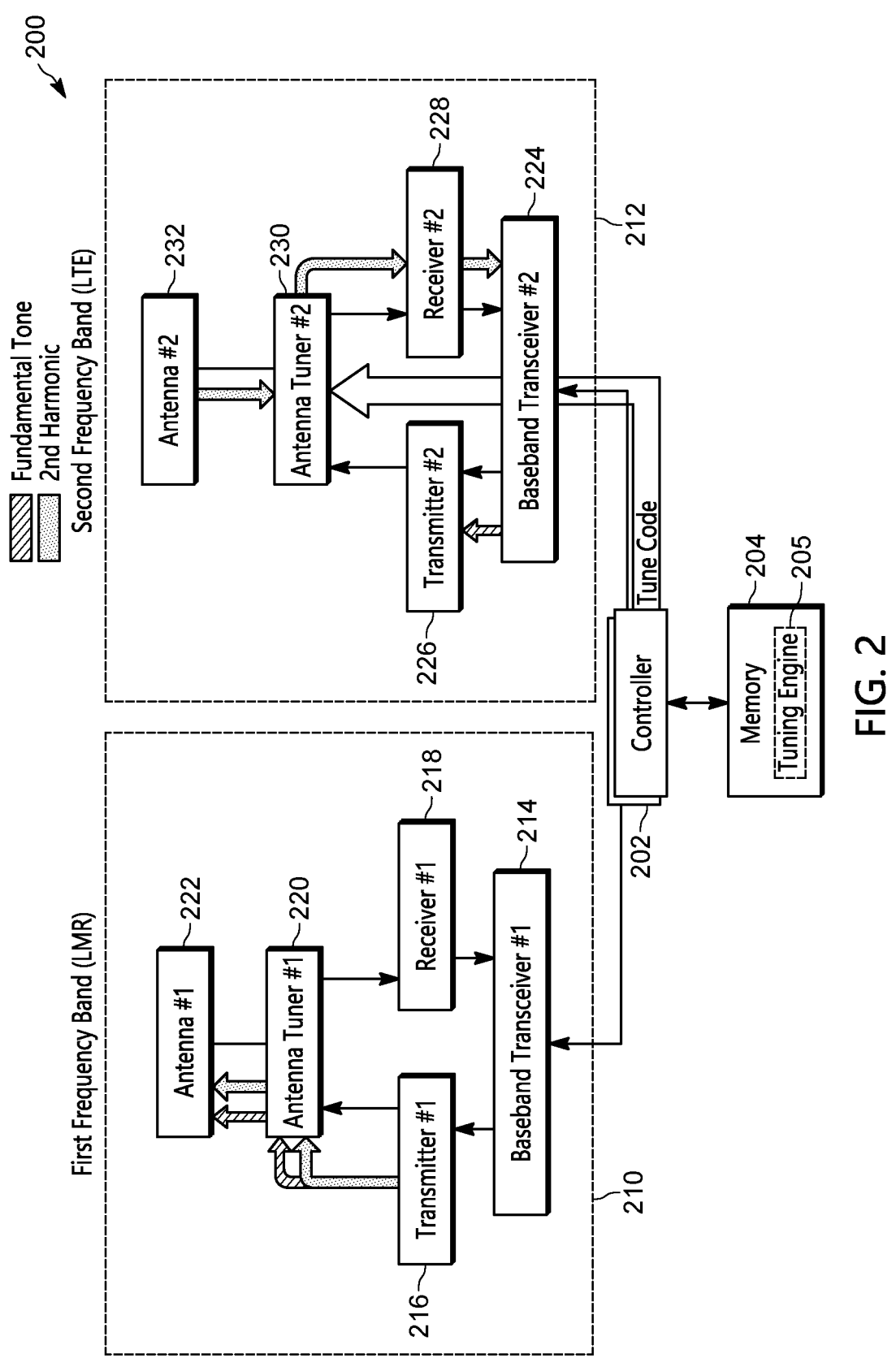
FIG. 2 schematically illustrates a converged wireless communication device, according to some examples.

FIG. 2 schematically illustrates one example of a converged wireless communication device 200. In the example illustrated, the converged wireless communication device

200 includes a controller 202, memory 204, a first subsystem 210, and a second subsystem 212. The illustrated components, along with other various modules and components are coupled to each other by or through one or more control or data buses that enable communication therebetween. In some embodiments, the converged wireless communication device 200 includes fewer or additional components in configurations different from that illustrated in FIG. 2 and described herein.

The first subsystem 210 and the second subsystem 212 are each a radio communication system. In some examples, the first subsystem 210 and the second subsystem 212 operate according to different modulation schemes. For example, the first subsystem 210 may be an LMR subsystem and the second subsystem 212 may be a cellular subsystem. An LMR subsystem operates as described above with respect to the multi-band wireless communication device 100. A cellular subsystem may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VOIP), an LTE Direct or LTE Device to Device, or a PTT over IP (PoIP) application may be implemented. Direct mode LTE standards may additionally or alternatively be implemented as well, including but not limited to the LTE Direct device-to-device standard. In some aspects, a cellular subsystem may operate according to future-developed protocols and still implement the techniques disclosed herein.

In some examples, the controller 202 controls both the first subsystem 210 and the second subsystem 212. In other examples, the converged wireless communication device 200 includes one or more controllers for each of the first subsystem 210 and the second subsystem 212. In such examples, the first subsystem 210 and the second subsystem 212 may be communicatively coupled to one another via an inter processor link or another suitable means.

The controller 202 is an electronic controller that includes at least one electronic processor, and is configured to obtain and provide information (for example, from the memory 204 and/or the baseband transceivers 214,224), and processes the information by executing one or more software instructions or modules, capable of being stored, for example, in a random access memory ("RAM") area or a read only memory ("ROM") of the memory 204 or another non-transitory computer readable medium (not shown). The software can include firmware, one or more applications, program data, filters, rules, one or more program modules, and other executable instructions. The controller 202 is configured to retrieve from the memory 204 and execute, among other things, software related to the control processes and methods described herein. The memory 204 can include one or more non-transitory computer-readable media and includes a program storage area and a data storage area. The program storage area and the data storage area can include combinations of different types of memory, as described herein. In the embodiment illustrated, the memory 204 stores, among other things, a tuning engine 205 (as described herein).

Each of the first subsystem 210 and second subsystem 212 includes respective baseband transceivers 214, 224; transmitters 216, 226; receivers 218, 228; antenna tuners 220, 230; and antennas 222, 232. The components of the first subsystem 210 and the second subsystem 212 are configured and operate similarly to the similarly named components described above with respect to the multi-band wireless communication device 100. Likewise, the converged wireless communication device 200 may also include components not shown such as, for example, a microphone, a speaker, a display, a PTT mechanism, which are implemented in hardware, software, or a combination of both. In some examples, the converged wireless communication device 200 may be coupled (e.g., using a wired or wireless connection) to an accessory device (e.g., a remote speaker microphone (RSM) or headset). Some examples of the converged wireless communication device 200 may also include a display or other input/output devices that enable a user to interact with and control the converged wireless communication device 200.

The controller 202 is configured to control the baseband transceiver 214 and the transmitter 216 to generate and transmit radiofrequency signals at a fundamental frequency. Additional radiofrequency signals, at harmonics (including the 2nd harmonic) of the fundamental frequency are also generated and transmitted. In some examples, the first subsystem 210 operates in a first frequency band and the second subsystem 212 operates in a second frequency band. In the example illustrated in FIG. 2, the first frequency band is a frequency band used in LMR communications and the second frequency band is a frequency band used in LTE communications. In this example, signals generated in the first frequency band generate second harmonic signals in the second frequency band. As illustrated in FIG. 2, these signals can be received by the receiver 228 and analyzed by the controller 202 as described herein.

Antenna tuners in wireless communication devices are tuned using parameters for a given configuration of the wireless communication device and depend on certain conditions including, among other things, the type of antenna, the signals being transmitted, and the environment surrounding the radio. Over time, the conditions may change, decreasing the effectiveness of the antenna tuner. Accordingly, methods are provided herein for dynamic antenna tuning compensation.

Figure 3:
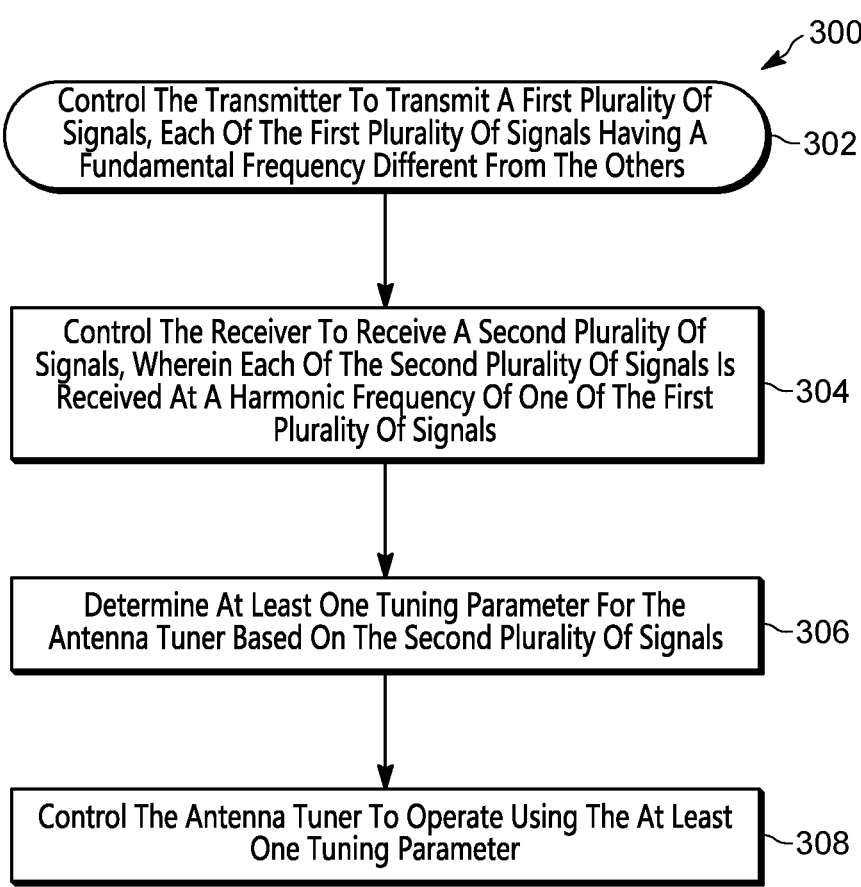
FIG. 3 is a flowchart illustrating a method for operating a wireless communication device, according to some examples.

FIG. 3 illustrates an example method 300 for dynamic antenna tuning compensation. Although the method 300 is described in conjunction with the multi-band wireless communication device 100 and/or the converged wireless communication device 200, the method 300 may be used with other systems and devices. In addition, the method 300 may be modified or performed differently than the specific example provided.

By way of example, the method 300 is described as being performed by either one of the multi-band wireless communication device 100 and the converged wireless communication device 200, and, in particular, their respective controllers (e.g., one or more electronic processors thereof). However, it should be understood that portions of the method 300 are be performed by other devices or components. In some examples, the method 300 is implemented by the controller executing the tuning engine 105 or the tuning engine 205 (e.g., a software routine including instructions that, when executed, cause the controller to perform the steps of the method 300).

The method 300 is described in terms of a first frequency band and a second frequency band. The first frequency band has a first frequency range, and the second frequency band has a second frequency range. The second frequency range is higher than the first frequency range. In particular, the difference in frequency ranges is such that the second harmonic frequencies of signals produced in the first frequency range fall within the second frequency range. In some examples, the first frequency band is an LMR frequency band, and the second frequency band is an LTE frequency band. In some examples, both frequency bands are LMR frequency bands.

The method 300 begins, at block 302, with the electronic processor (e.g., of the controller 102 or the controller 202) controlling a transmitter to transmit a first plurality of signals in the first frequency band, each of the first plurality of signals having a fundamental frequency different from the others. For example, the electronic processor may control the transmitter to generate a signal with a fundamental frequency near a first edge of the first frequency band (e.g., signal $f_1$), a signal with a fundamental frequency near a second edge of the first frequency band (e.g., signal $f_3$), and a signal with a fundamental frequency near the center of the first frequency band (e.g., signal $f_2$). In some examples, only two signals (e.g., $f_1$ and $f_3$) are transmitted.

In some examples, the transmitted signals are RF tones, due to their spectral efficiency. The signals may be transmitted sequentially or simultaneously.

Figure 4A:
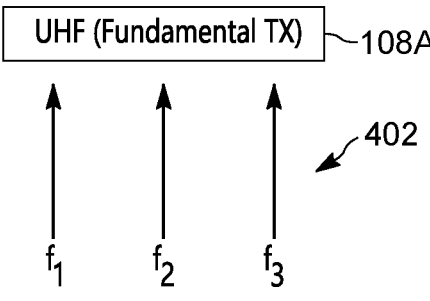
FIG. 4A & FIG. 4B illustrate aspects of the operation of the method of FIG. 3, according to some examples.
Figure 5A:
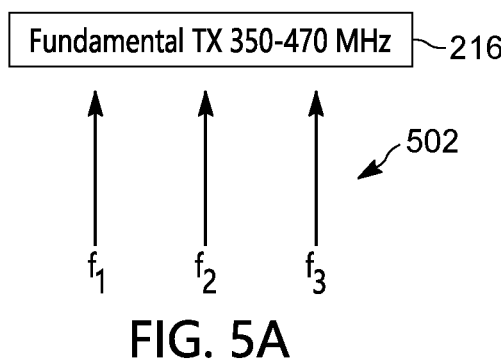
FIG. 5A & FIG. 5B illustrate aspects of the operation of the method of FIG. 3, according to some examples.

Two examples for block 302 are illustrated in FIGS. 4A and 5A. In FIG. 4A, the controller 102 controls the transmitter 108A to transmit the first plurality of signals 402. In FIG. 5A, the controller 202 controls the transmitter 216 to transmit the first plurality of signals 502.

As described herein, producing a radio frequency signal at a fundamental frequency will also produce secondary signals at harmonics of the fundamental frequency. At block 304, the electronic processor controls a receiver operating in the second frequency band to receive a second plurality of signals. In one example, each of the second plurality of signals is received at a second harmonic frequency of one of the first plurality of signals (transmitted at block 302).

Figure 4B:
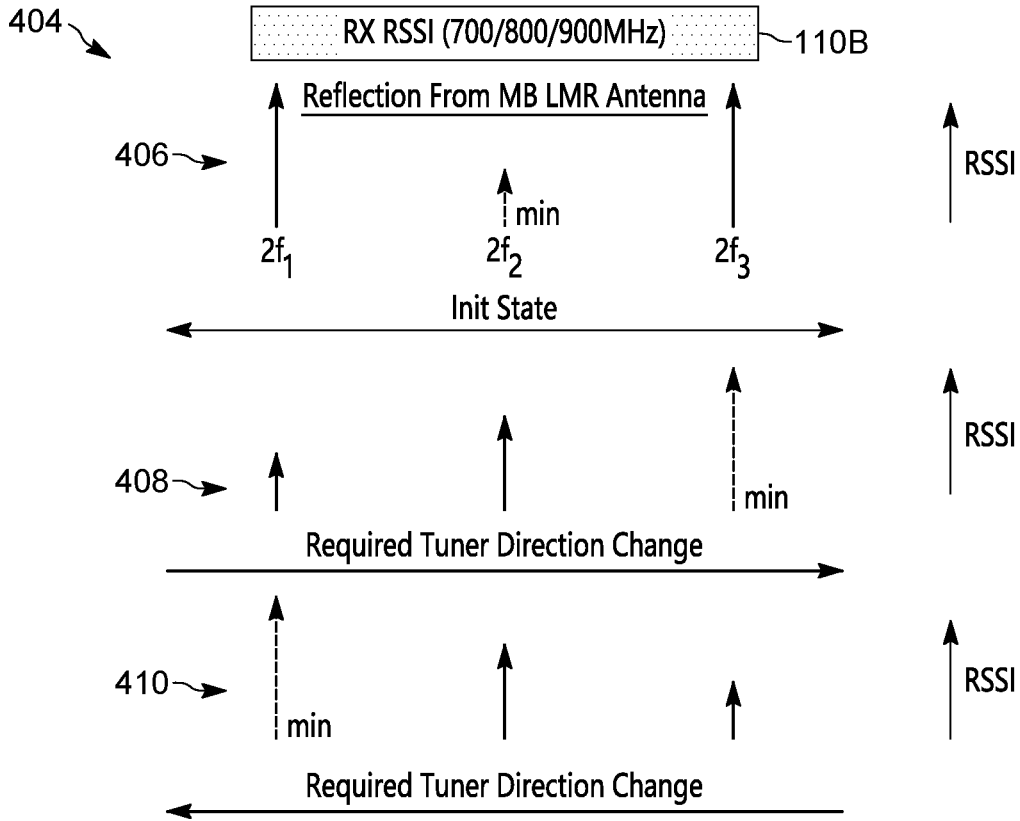
Figure 5B:
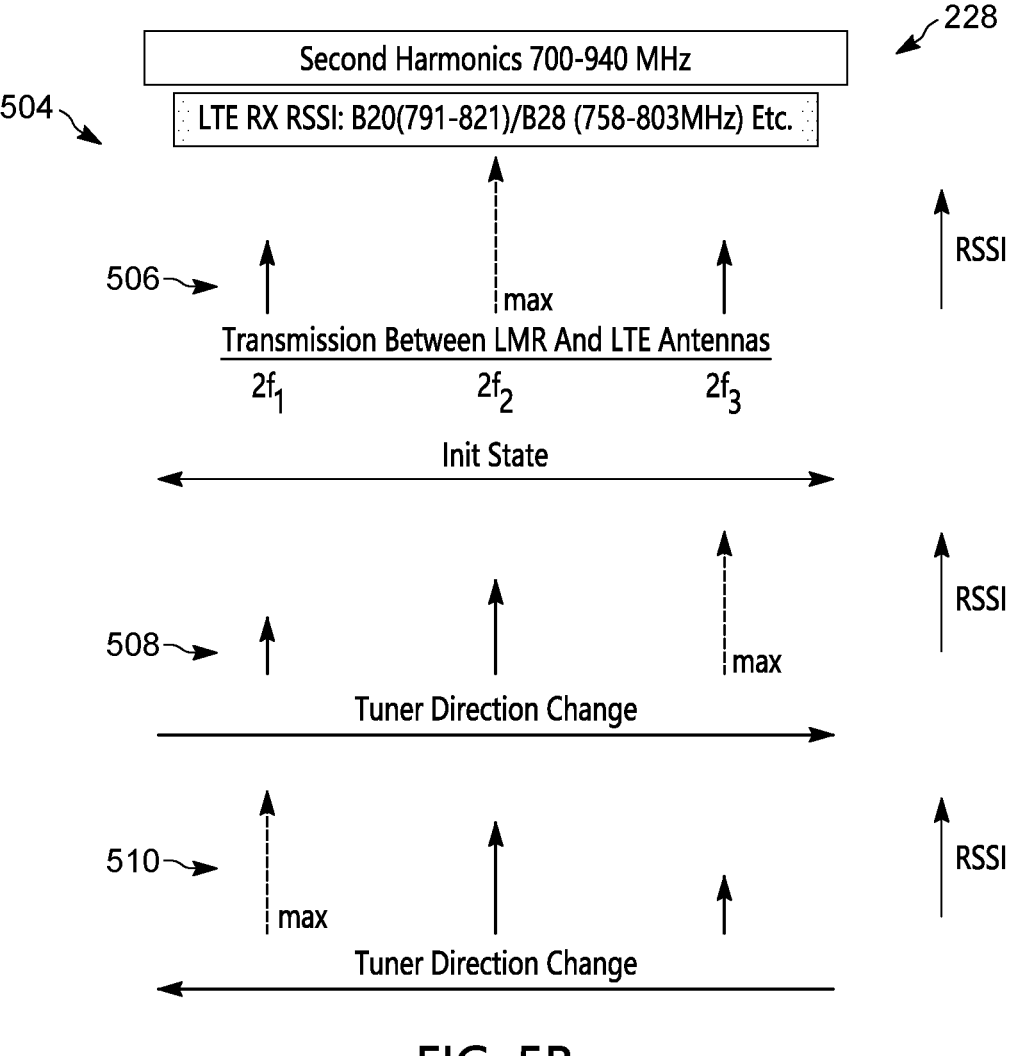

Two examples for block 304 are illustrated in FIGS. 4B and 5B. In FIG. 4B, the controller 102 controls the receiver 110B to receive the second plurality of signals 404. In FIG. 5B, the controller 202 controls the receiver 228 to receive the second plurality of signals 504.

At block 306, the electronic processor analyzes the received signals to determine one or more tuning parameters for the antenna tuner based on the second plurality of signals (received at block 304). For example, the electronic processor may determine, for each of the second plurality of signals, a received signal strength indication (RSSI) and determine one or more tuning parameters for the antenna tuner based on the RSSIs for the second plurality of signals.

One example is illustrated in FIG. 4B, with respect to the multi-band wireless communication device 100. FIG. 4B illustrates several samples of the second plurality of signals 404 being received by the receiver 110B. Sample 406 shows the second plurality of signals ($2f_1$, $2f_2$, and $2f_3$) with RSSI values matching their initial state. The initial state represents the second harmonic signals that would be expected if the antenna tuner was performing as desired. As illustrated, in this example, the signal having the minimum RSSI should be at the center of the band. If the second plurality of signals has RSSI values matching this initial state (or within an acceptable tolerance of this initial state), then no adjustment would be made. In sample 408, the RSSI values indicate that the signal with minimum RSSI is at the upper edge of the second frequency band and therefore the tuning parameters need to be adjusted higher. In sample 410, the RSSI values indicate that the signal with minimum RSSI is at the lower edge of the second frequency band and therefore the tuning parameters need to be adjusted lower.

Another example is illustrated in FIG. 5B, with respect to the converged wireless communication device 200. FIG. 5B illustrates several samples of the second plurality of signals 504 being received by the receiver 228. Sample 506 shows the second plurality of signals ($2f_1$, $2f_2$, and $2f_3$) with RSSI values matching their initial state. The initial state represents the second harmonic signals that would be expected if the antenna tuner was performing as desired. As illustrated, in this example, the signal having the maximum RSSI should be at the center of the band. If the second plurality of signals has RSSI values matching this initial state (or within an acceptable tolerance of this initial state), then no adjustment would be made. In sample 508, the RSSI values indicate that the signal with maximum RSSI is at the upper edge of the second frequency band and therefore the tuning parameters need to be adjusted higher. In sample 510, the RSSI values indicate that the signal with maximum RSSI is at the lower edge of the second frequency band and therefore the tuning parameters need to be adjusted lower.

Other techniques for determining tuning parameters are described herein with respect to FIGS. 6-8.

At block 308, the electronic processor controls the antenna tuner used for the second frequency band to operate using the one or more tuning parameters (determined at block 306). For example, the controller 102, 202 may send control signals to the appropriate antenna tuner to adjust its electronic components to adjust its impedance matching.

In some examples, the method 300 is performed responsive to a trigger condition. For example, the controller may receive a user input requesting that the antenna be re-tuned. In another example, the trigger condition is a periodic timer, which causes the antenna to be dynamically re-tuned at desired intervals over time. In another example, the trigger condition is a change in conditions sensed by the controller. For example, the controller may be configured to monitor a voltage standing wave ratio (VSWR) for the transmitters and trigger a re-tuning of the antenna based on the VSWR exceeding a threshold. In another example, the change in conditions may be a change in the environment surrounding the wireless communication device, such as whether the device is located indoors or outdoors (e.g., as determined using a geolocation system).

FIG. 6 illustrates an example method 600 for, among other things, dynamic antenna tuning compensation. Although the method 600 is described in conjunction with the multi-band wireless communication device 100 and/or the converged wireless communication device 200, the method 600 may be used with other systems and devices. In addition, the method 600 may be modified or performed differently than the specific example provided.

By way of example, the method 600 is described as being performed by either one of the multi-band wireless communication device 100 and the converged wireless communication device 200, and, in particular, their respective controllers (e.g., one or more electronic processors thereof). However, it should be understood that portions of the method 600 are be performed by other devices or components. In some examples, the method 600 is implemented by the controller executing the tuning engine 105 or the tuning engine 205 (e.g., a software routine including instructions that, when executed, cause the controller to perform the steps of the method 600).

The method 600 is described in terms of a first frequency band and a second frequency band. The first frequency band has a first frequency range, and the second frequency band has a second frequency range. The second frequency range is higher than the first frequency range. In particular, the difference in frequency ranges is such that the second harmonic frequencies of signals produced in the first frequency range fall within the second frequency range. In some examples, the first frequency band is an LMR frequency band, and the second frequency band is an LTE frequency band. In some examples, both frequency bands are LMR frequency bands.

The method 600 begins, at block 602, with the antenna tuner for the second frequency band operating using initial parameters defined during evaluation or production of the wireless communication device. For example, the memory of the wireless communication device may be loaded with default tuning parameters based on the components used in the device (e.g., the transmitters, receivers, active electronic components, passive physical components, and the antenna). Tuning parameters may also be set based on expected operating conditions (e.g., whether the radio will be primarily hand-held, or body worn).

At block 604, the electronic processor measures RSSI values for second harmonics using the initial parameters. For example, this may be does as described above with respect to the method 300, by transmitting three signals in the first frequency band and receiving and analyzing three corresponding harmonics in the second frequency band. In some examples, the RSSI values are stored in the memory of the wireless communication device (e.g., for use in performing antenna tuning).

At block 606, the electronic processor controls a transmitter operating in the first frequency band to transmit a first plurality of signals ($f_1$, $f_2$, and $f_3$) in the first frequency band, each of the first plurality of signals having a fundamental frequency different from the others. In some examples, three signals are transmitted. While a minimum of two signals is required to perform the dynamic tuning, transmitting and analyzing more than three signals would provide more granularity.

At block 608, the electronic controller controls a receiver operating in the second frequency band to receive a second plurality of signals ($2f_1$, $2f_2$, and $2f_3$) in the second frequency band. For example, as the transmitter transmits its signals (at block 606), the electronic processor may tune the receiver to a receive frequency of twice the fundamental frequency of the signal being transmitted and record the RSSI of the received signal, (repeating this for each signal transmitted by the transmitter).

At block 610, the electronic processor analyzes the RSSI values of the second plurality of received signals ($2f_1$, $2f_2$, and $2f_3$) to determine improved tuning parameters for the antenna tuner coupled to the receiving antenna. For example, the electronic processor may implement the method 700, described with respect to FIG. 7. In some examples, the electronic controller performs this step while the device is an idle mode.

As illustrated in FIG. 6, the electronic processor (at block 612) may repeat blocks 606-610 periodically. In some aspects, the electronic processor may perform these steps based on another trigger, such as those described herein with respect to the method 300.

FIG. 7 illustrates an example method 700 for, among other things, selecting antenna tuning parameters. Although the method 700 is described as being performed in conjunction with the method 600, the method 700 may be used under other circumstances. In addition, the method 700 may be modified or performed differently than the specific example provided.

Figure 8A:
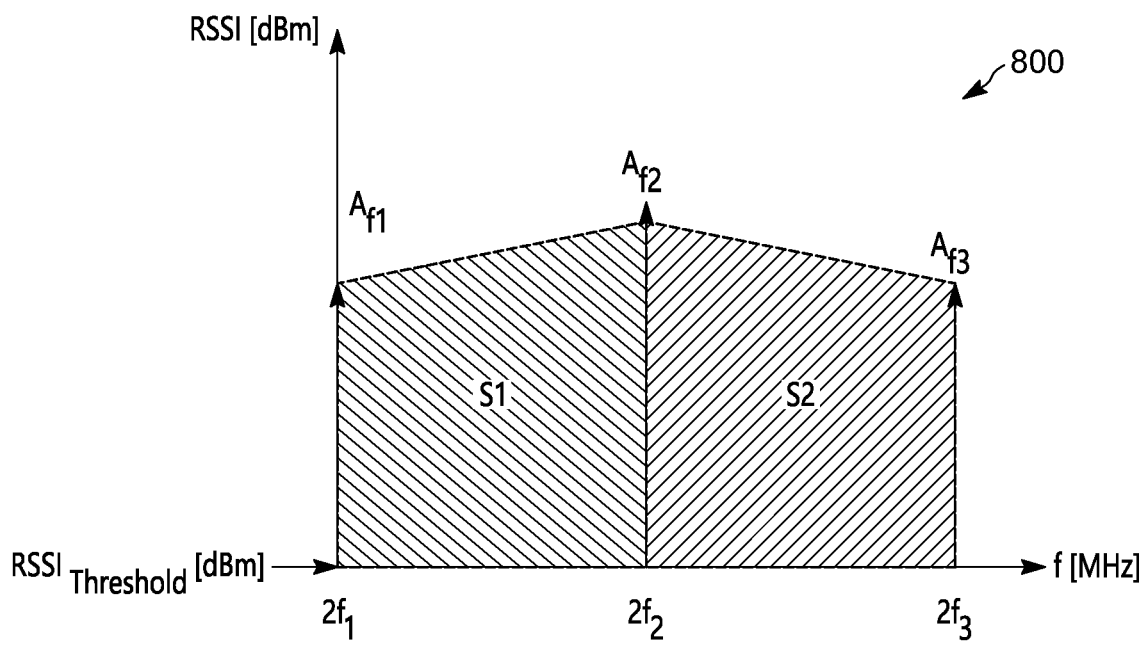
FIG. 8A & FIG. 8B include charts illustrating aspects of the operation of the method of FIG. 7, according to some examples.
Figure 8B:
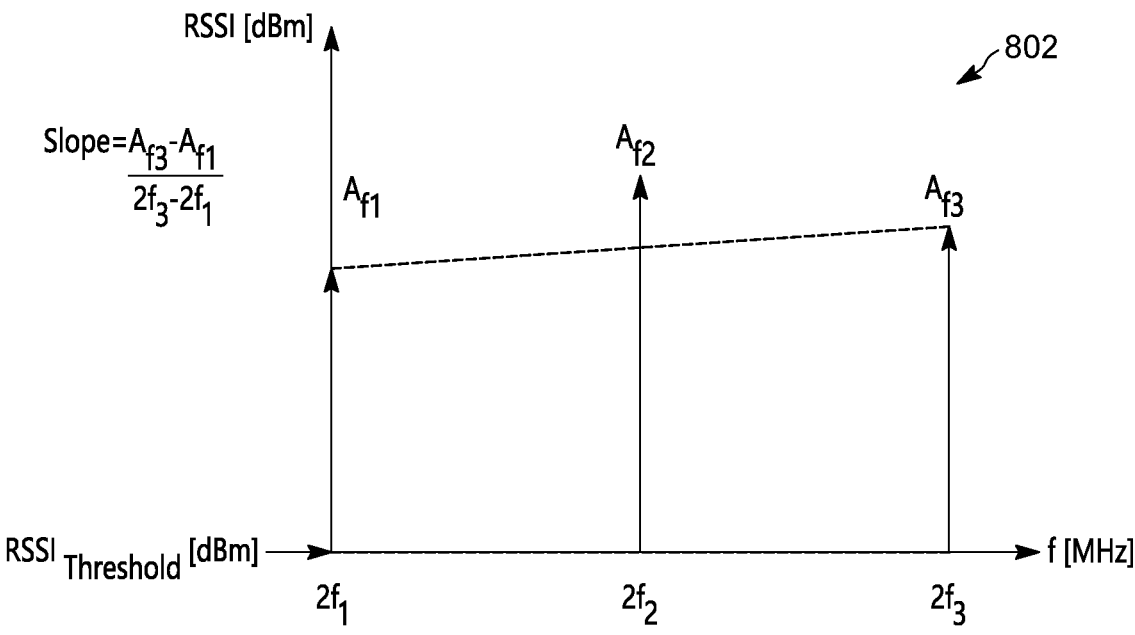

At block 702 the electronic processor uses the initial RSSI values (as described with respect to the method 600) to calculate areas and a slope defined by the RSSI values. FIG. 8A includes a graph 800 illustrating an example of this process. As illustrated in FIG. 8A, the RSSI values of the received signals ($2f_1$, $2f_2$, and $2f_3$) for two areas: S1 and S2. The electronic processor can determine S1 and S2 using the formula for calculating the area of a trapezoid. As illustrated in FIG. 8B, the slope is for a line defined by the RSSI values of the received signals ($2f_1$ and $2f_3$) and may be calculated using the formula: Slope=$(Af_3-Af_1)/(2f_3-2f_1)$.

At block 704, the electronic processor controls a transmitter operating in the first frequency band to transmit a first plurality of signals ($f_1$, $f_2$, and $f_3$) in the first frequency band, each of the first plurality of signals having a fundamental frequency different from the others.

At block 706, the electronic controller controls a receiver operating in the second frequency band to receive a second plurality of signals ($2f_1$, $2f_2$, and $2f_3$) in the second frequency band and measures the RSSI of received signals. In some multi-band wireless communication devices, the second harmonic frequencies of some frequency bands may not fall fulling within the second frequency band. In such instances, the electronic controller may extrapolate the RSSI values for some of the second harmonics by receiving the one or more of the second plurality of signals on another band and measuring those signals.

At block 708, the electronic processor calculates new area (S1' and S2') and slope values based on the signals received at block 706. The electronic processor compares the new area and slope values to the initial values (determined at block 702) to determine whether the antenna tuning parameters should be adjusted.

For example, where the values vary from the initial values beyond a threshold amount, the electronic processor may adjust the tuning parameters to improve the performance of the antenna for the second frequency band. At block 710, the electronic processor adjusts the tuning parameters according to slope changes to maximize the sum of the values of S1' and S2'. For example, where the slope is positive, the tuning parameters are adjusted to decrease the slope and where the slops is negative the tuning parameters are adjusted to increase the slope. Maximizing the sum of the values of S1' and S2' is effective for tuning an antenna for an LTE system (e.g., while performing the method 700 for the converged wireless communication device 200). Where the method 700 is performed for the multi-band wireless communication device 100, the tuning parameters according to slope changes to minimize the sum of the values of S1' and S2'.

As described above, the methods for dynamic antenna tuning compensation are performed within a single device. However, in some examples, the methods described herein may be performed using two or more wireless communication devices. For example, an LMR device and an LTE device may be in wireless communication and cooperate to perform the methods described herein. For example, an LTE device may determine that it is close enough to an LMR device to receive the second harmonic signals produced by the LMR device. In another example, the two devices may be placed close to one another for the purpose of performing dynamic antenna tuning compensation. The controller of the LTE device may issue commands to the LMR device to transmit signals as described herein. Similarly, two LMR devices may cooperate to perform the methods described herein.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive radiofrequency signals, and cannot automatically determine RSSI values for radiofrequency signals, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices.

Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The following paragraphs provide various examples of the embodiments disclosed herein.

Example 1. A wireless communication device comprising: a transmitter; a receiver; an antenna coupled to the receiver; an antenna tuner coupled to the antenna; a memory; and an electronic processor coupled to the transmitter, the receiver, the antenna tuner, and the memory; wherein the electronic processor is configured to retrieve, from the memory, executable instructions that, when executed by the electronic processor, cause the electronic processor to: control the transmitter to transmit a first plurality of signals, each of the first plurality of signals having a fundamental frequency different from the others; control the receiver to receive a second plurality of signals, wherein each of the second plurality of signals is received at a harmonic frequency of one of the first plurality of signals; determine at least one tuning parameter for the antenna tuner based on the second plurality of signals; and control the antenna tuner to operate using the at least one tuning parameter.

Example 2. The device of Example 1, wherein the executable instructions further cause the electronic processor to: determine, for each of the second plurality of signals, a received signal strength indication (RSSI); and determine the at least one tuning parameter for the antenna tuner based on the RSSIs for the second plurality of signals.

Example 3. The device of Example 1, wherein: the transmitter is configured to operate on a first frequency band; the first plurality of signals includes a first signal and a second signal; a fundamental frequency of the first signal is near a first edge of the first frequency band; and a fundamental frequency of the second signal is near a second edge of the first frequency band.

Example 4. The device of Example 3, wherein: the receiver is configured to operate on a second frequency band; the second plurality of signals includes a first received signal and a second received signal; the first received signal is a harmonic of the first signal; the second received signal is a harmonic of the second signal; and the executable instructions further cause the electronic processor to: measure a first RSSI for the first received signal; measure a second RSSI for the second received signal; determine a slope based on the first RSSI and the second RSSI; and adjust the at least one tuning parameter for the antenna tuner based on the slope.

Example 5. The device of Example 4, wherein: the first plurality of signals includes a third signal that has a fundamental frequency near a center of the first frequency band; the second plurality of signals includes a third received signal that is a harmonic of the third signal; and the executable instructions further cause the electronic processor to: measure a third RSSI for the third received signal; calculate a first area based on the first RSSI and the second RSSI; calculate a second area based on the second RSSI and the third RSSI; and adjust the at least one tuning parameter based on a sum of the first area and the second area.

Example 6. The device of Example 5, wherein: the transmitter is configured to operate according to a first modulation; the receiver is configured to operate according to the first modulation; and the executable instructions further cause the electronic processor to: adjust the at least one tuning parameter to minimize the sum of the first area and the second area.

Example 7. The device of Example 5, wherein: the transmitter is configured to operate according to a first modulation; the receiver is configured to operate according to a second modulation; and the executable instructions further cause the electronic processor to: adjust the at least one tuning parameter to maximize the sum of the first area and the second area.

Example 8. The device of Example 6, wherein the harmonic of the first signal, the harmonic of the second signal, and the harmonic of the third signal are second harmonics.

Example 9. The device of Example 6, wherein the executable instructions further cause the electronic processor to control the transmitter to transmit the first plurality of signals in response to a trigger condition.

Example 10. The device of Example 4, wherein: the first frequency band has a first frequency range; and the second frequency band has a second frequency range configured such that second harmonic frequencies of the first frequency range fall within the second frequency range.

Example 11. A method for operating a wireless communication device, the method comprising: controlling a transmitter to transmit a first plurality of signals, each of the first plurality of signals having a fundamental frequency different from the others; controlling a receiver to receive a second plurality of signals, wherein each of the second plurality of signals is received at a harmonic frequency of one of the first plurality of signals; determining at least one tuning parameter for an antenna tuner based on the second plurality of signals; and controlling the antenna tuner to operate using the at least one tuning parameter.

Example 12. The method of Example 11, further comprising: determining, for each of the second plurality of signals, a received signal strength indication (RSSI); and determining the at least one tuning parameter for the antenna tuner based on the RSSIs for the second plurality of signals.

Example 13. The method of Example 12, wherein: transmitting the first plurality of signals includes transmitting a first signal and a second signal on a first frequency band; the fundamental frequency of the first signal is near a first edge of the first frequency band; and the fundamental frequency of the second signal is near a second edge of the first frequency band.

Example 14. The method of Example 13, wherein: receiving the second plurality of signals includes receiving a first received signal and a second received signal on a second frequency band; the first received signal is a harmonic of the first signal; and the second received signal is a harmonic of the second signal; and the method further includes: measuring a first RSSI for the first received signal; measuring a second RSSI for the second received signal; determining a slope based on the first RSSI and the second RSSI; and adjusting the at least one tuning parameter for the antenna tuner based on the slope.

Example 15. The method of Example 14, wherein: transmitting the first plurality of signals includes transmitting a third signal that has a fundamental frequency near a center of the first frequency band; receiving the second plurality of signals includes receiving a third received signal that is a harmonic of the third signal; and the method further comprises: measuring a third RSSI for the third received signal; calculating a first area based on the first RSSI and the second RSSI; calculating a second area based on the second RSSI and the third RSSI; and adjusting the at least one tuning parameter based on a sum of the first area and the second area.

Example 16. The method of Example 15, wherein: operating the transmitter according to a first modulation; operating the receiver according to the first modulation; and adjusting the at least one tuning parameter to minimize the sum of the first area and the second area.

Example 17. The method of Example 15, wherein: operating the transmitter according to a first modulation; operating the receiver according to a second modulation; and adjusting the at least one tuning parameter to maximize the sum of the first area and the second area.

Example 18. The method of Example 16, wherein the harmonic of the first signal, the harmonic of the second signal, and the harmonic of the third signal are second harmonics.

Example 19. The method of Example 16, wherein controlling the transmitter to transmit the first plurality of signals includes controlling the transmitter to transmit the first plurality of signals in response to a trigger condition.

Example 20. A system comprising: a transmitter; a receiver; an antenna coupled to the receiver; an antenna tuner coupled to the antenna; a memory; and an electronic processor coupled to the transmitter, the receiver, the antenna tuner, and the memory; wherein the electronic processor is configured to retrieve, from the memory, executable instructions that, when executed by the electronic processor, cause the electronic processor to: control the transmitter to transmit a first plurality of signals, each of the first plurality of signals having a fundamental frequency different from the others; control the receiver to receive a second plurality of signals, wherein each of the second plurality of signals is received at a harmonic frequency of one of the first plurality of signals; determine at least one tuning parameter for the antenna tuner based on the second plurality of signals; and control the antenna tuner to operate using the at least one tuning parameter.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A wireless communication device comprising:
a transmitter;
a receiver;
an antenna coupled to the receiver;
an antenna tuner coupled to the antenna;
a memory; and
an electronic processor coupled to the transmitter, the receiver, the antenna tuner, and the memory;
wherein the electronic processor is configured to retrieve, from the memory, executable instructions that, when executed by the electronic processor, cause the electronic processor to:
control the transmitter to transmit a first plurality of signals, each of the first plurality of signals having a fundamental frequency different from the others;
control the receiver to receive a second plurality of signals, wherein each of the second plurality of signals is received at a harmonic frequency of one of the first plurality of signals;
determine at least one tuning parameter for the antenna tuner based on the second plurality of signals; and
control the antenna tuner to operate using the at least one tuning parameter.

2. The device of claim 1, wherein the executable instructions further cause the electronic processor to:
determine, for each of the second plurality of signals, a received signal strength indication (RSSI); and
determine the at least one tuning parameter for the antenna tuner based on the RSSIs for the second plurality of signals.

3. The device of claim 1, wherein:
the transmitter is configured to operate on a first frequency band;
the first plurality of signals includes a first signal and a second signal;
a fundamental frequency of the first signal is near a first edge of the first frequency band; and
a fundamental frequency of the second signal is near a second edge of the first frequency band.

4. The device of claim 3, wherein:
the receiver is configured to operate on a second frequency band;
the second plurality of signals includes a first received signal and a second received signal;
the first received signal is a harmonic of the first signal;
the second received signal is a harmonic of the second signal; and
the executable instructions further cause the electronic processor to:
measure a first RSSI for the first received signal;
measure a second RSSI for the second received signal;
determine a slope based on the first RSSI and the second RSSI; and
adjust the at least one tuning parameter for the antenna tuner based on the slope.

5. The device of claim 4, wherein:
the first plurality of signals includes a third signal that has a fundamental frequency near a center of the first frequency band;

the second plurality of signals includes a third received signal that is a harmonic of the third signal; and
the executable instructions further cause the electronic processor to:
measure a third RSSI for the third received signal;
calculate a first area based on the first RSSI and the second RSSI;
calculate a second area based on the second RSSI and the third RSSI; and
adjust the at least one tuning parameter based on a sum of the first area and the second area.

6. The device of claim 5, wherein:
the transmitter is configured to operate according to a first modulation;
the receiver is configured to operate according to the first modulation; and
the executable instructions further cause the electronic processor to:
adjust the at least one tuning parameter to minimize the sum of the first area and the second area.

7. The device of claim 5, wherein:
the transmitter is configured to operate according to a first modulation;
the receiver is configured to operate according to a second modulation; and
the executable instructions further cause the electronic processor to:
adjust the at least one tuning parameter to maximize the sum of the first area and the second area.

8. The device of claim 6, wherein the harmonic of the first signal, the harmonic of the second signal, and the harmonic of the third signal are second harmonics.

9. The device of claim 6, wherein the executable instructions further cause the electronic processor to control the transmitter to transmit the first plurality of signals in response to a trigger condition.

10. The device of claim 4, wherein:
the first frequency band has a first frequency range; and
the second frequency band has a second frequency range configured such that second harmonic frequencies of the first frequency range fall within the second frequency range.

11. A method for operating a wireless communication device, the method comprising:
controlling a transmitter to transmit a first plurality of signals, each of the first plurality of signals having a fundamental frequency different from the others;
controlling a receiver to receive a second plurality of signals, wherein each of the second plurality of signals is received at a harmonic frequency of one of the first plurality of signals;
determining at least one tuning parameter for an antenna tuner based on the second plurality of signals; and
controlling the antenna tuner to operate using the at least one tuning parameter.

12. The method of claim 11, further comprising:
determining, for each of the second plurality of signals, a received signal strength indication (RSSI); and
determining the at least one tuning parameter for the antenna tuner based on the RSSIs for the second plurality of signals.

13. The method of claim 12, wherein:
transmitting the first plurality of signals includes transmitting a first signal and a second signal on a first frequency band;
the fundamental frequency of the first signal is near a first edge of the first frequency band; and the fundamental frequency of the second signal is near a second edge of the first frequency band.

14. The method of claim 13, wherein:

receiving the second plurality of signals includes receiving a first received signal and a second received signal on a second frequency band;

the first received signal is a harmonic of the first signal; and the second received signal is a harmonic of the second signal; and the method further includes:

measuring a first RSSI for the first received signal;

measuring a second RSSI for the second received signal;

determining a slope based on the first RSSI and the second RSSI; and adjusting the at least one tuning parameter for the antenna tuner based on the slope.

15. The method of claim 14, wherein:

transmitting the first plurality of signals includes transmitting a third signal that has a fundamental frequency near a center of the first frequency band;

receiving the second plurality of signals includes receiving a third received signal that is a harmonic of the third signal; and the method further comprises:

measuring a third RSSI for the third received signal;

calculating a first area based on the first RSSI and the second RSSI;

calculating a second area based on the second RSSI and the third RSSI; and adjusting the at least one tuning parameter based on a sum of the first area and the second area.

16. The method of claim 15, wherein:

operating the transmitter according to a first modulation;

operating the receiver according to the first modulation; and adjusting the at least one tuning parameter to minimize the sum of the first area and the second area.

17. The method of claim 15, wherein:

operating the transmitter according to a first modulation;

operating the receiver according to a second modulation; and adjusting the at least one tuning parameter to maximize the sum of the first area and the second area.

18. The method of claim 16, wherein the harmonic of the first signal, the harmonic of the second signal, and the harmonic of the third signal are second harmonics.

19. The method of claim 16, wherein controlling the transmitter to transmit the first plurality of signals includes controlling the transmitter to transmit the first plurality of signals in response to a trigger condition.

20. A system comprising:

a transmitter;

a receiver;

an antenna coupled to the receiver;

an antenna tuner coupled to the antenna;

a memory; and an electronic processor coupled to the transmitter, the receiver, the antenna tuner, and the memory;

wherein the electronic processor is configured to retrieve, from the memory, executable instructions that, when executed by the electronic processor, cause the electronic processor to:

control the transmitter to transmit a first plurality of signals, each of the first plurality of signals having a fundamental frequency different from the others;

control the receiver to receive a second plurality of signals, wherein each of the second plurality of signals is received at a harmonic frequency of one of the first plurality of signals;

determine at least one tuning parameter for the antenna tuner based on the second plurality of signals; and control the antenna tuner to operate using the at least one tuning parameter.

* * * * *